United States Patent
Dagher et al.

(10) Patent No.: US 8,197,732 B2
(45) Date of Patent: Jun. 12, 2012

(54) COMPOSITE REINFORCED ORIENTED STRAND BOARD

(75) Inventors: Habib J. Dagher, Veazie, ME (US); Russell A. Edgar, Orono, ME (US); Jon R. Hill, Greenfield, ME (US)

(73) Assignee: University of Maine System Board of Trustees, Bangor, ME (US)

( * ) Notice: Subject to any disclaimer, the term of this patent is extended or adjusted under 35 U.S.C. 154(b) by 48 days.

(21) Appl. No.: 12/795,968

(22) Filed: Jun. 8, 2010

(65) Prior Publication Data

US 2010/0304081 A1     Dec. 2, 2010

Related U.S. Application Data

(63) Continuation of application No. 12/581,972, filed on Oct. 20, 2009, now abandoned.

(51) Int. Cl.
    *B27N 3/00* (2006.01)
(52) U.S. Cl. .................. 264/115; 264/109
(58) Field of Classification Search .............. None
    See application file for complete search history.

(56) References Cited

U.S. PATENT DOCUMENTS

| | | |
|---|---|---|
| 3,115,431 A | 12/1963 | Stokes et al. |
| 3,478,861 A | 11/1969 | Elmendorf |
| 4,380,285 A | 4/1983 | Burkner et al. |
| 4,623,058 A | 11/1986 | Bossler |
| 5,325,954 A | 7/1994 | Crittenden et al. |
| 5,404,990 A | 4/1995 | Barnes et al. |
| 6,276,511 B1 * | 8/2001 | Iredi et al. ............ 198/382 |
| 2002/0109254 A1 * | 8/2002 | Huber ................... 264/126 |

* cited by examiner

*Primary Examiner* — Mary F Theisen
(74) *Attorney, Agent, or Firm* — Michaud-Kinney Group LLP

(57) ABSTRACT

The present invention resides in one aspect in a building material that comprises wood and a composite polymeric material that is combined with the wood in a heterogenous admixture. The composite polymeric material incorporates fibers in a polymeric matrix. The fibers can be chopped, continuous, or combinations thereof. In addition, the fibers can be unidirectionally oriented and/or randomly oriented. Suitable fibers for use in the composite polymeric material are glass, polymers, carbon, combinations thereof, and the like. However, the present invention is not limited in this regard as other fibers known to those skilled in the pertinent art to which the invention pertains can be used without departing from the broader aspects of the present invention. Suitable polymeric material for the polymeric matrix include thermoplastic polymers, thermosetting polymers, or a combination of thermosetting and thermoplastic polymers.

9 Claims, 8 Drawing Sheets

COMPOSITE REINFORCED ORIENTED STRAND BOARD

CROSS REFERENCE TO RELATED APPLICATION

This application is a continuation of U.S. patent application Ser. No. 12/581,972, filed Oct. 20, 2009, which claims the benefit of U.S. Provisional Patent Application Ser. No. 61/106,658, filed Oct. 20, 2008, which is incorporated herein by reference in its entirety.

FIELD OF THE INVENTION

This invention relates to hybrid materials that employ composites and is more particularly directed to the use of fiber-reinforced polymer materials in flake or strand form in combination with other materials to produce composites having controllable mechanical properties.

BACKGROUND OF THE INVENTION

Oriented strand board (also known as "OSB") is an engineered wood product formed by layers of flakes or strands of wood placed in specific orientations and bound together. It is generally manufactured in mats from cross-oriented layers of thin, wood flakes compressed and bonded together with wax and resin adhesives. The mats are typically laminates comprising a plurality of layers built up with the external layers aligned to give the mats strength in desired directions. The number of layers of each mat is determined partly by the desired thickness of the mat and may be limited by the equipment used in the manufacturing process.

In a process of manufacturing the mats, the flakes are placed in a press having the ability to apply heat to the flakes. The flakes are compressed and bonded together by heat activation and curing of a resin that has been coated on the flakes. Individual panels are then cut from the mats to produce OSB panels of desired sizes. Also in the manufacturing process, the wood flakes may be treated with various compounds to inhibit infestation by insects and/or to discourage the growths of molds and fungi. Treatment may be either before the cutting of the mats into OSB panels or after.

Different qualities in terms of strength and rigidity can be imparted to the OSB by changes in the manufacturing process. Although finished OSB panels have no internal gaps or voids and are typically water-resistant due to the wax and resin adhesives, they generally require additional treatment to achieve impermeability to water, particularly when the OSB is for exterior use. Finished OSB panels have properties that are similar to plywood, but the panels are generally more uniform in construction. The most common uses of OSB are as sheathing in walls, floors, and roofs.

SUMMARY OF THE INVENTION

The present invention resides in one aspect in a building material that comprises wood and a composite polymeric material that is combined with the wood in a heterogenous admixture. The composite polymeric material incorporates fibers in a polymeric matrix. The fibers can be chopped, continuous, or combinations thereof. In addition, the fibers can be unidirectionally oriented and/or randomly oriented. Suitable fibers for use in the composite polymeric material are glass, polymers, carbon, combinations thereof, and the like. However, the present invention is not limited in this regard as other fibers known to those skilled in the pertinent art to which the invention pertains can be used without departing from the broader aspects of the present invention. Suitable polymeric material for the polymeric matrix include thermoplastic polymers, thermosetting polymers, or a combination of thermosetting and thermoplastic polymers.

Another aspect of the present invention resides in OSB (oriented strand board) that can be used as a building material. The OSB is made using wood flakes and flakes of a composite polymeric material that includes a reinforcing material located therein. The composite polymeric material flakes are mixed with the wood flakes so that the flakes of both are distributed throughout the OSB. An adhesive may be used to bind the wood flakes together with the flakes of the composite polymeric material. In addition, if the composite polymeric material is a thermoplastic material that forms a matrix in which the reinforcing material is located, and if two or more of the flakes of the composite polymeric material are touching one another, the present invention encompasses the use of heat and pressure to create the OSB, causing the thermoplastic material of the matrix to at least partially melt, thereby causing the flakes of the composite polymeric material to bond to one another and retaining the wood flakes therein.

The flakes of the composite polymeric material used in the OSB of the present invention can include thermoplastic materials. However, the flakes of the composite polymeric material can also include thermosetting materials or combinations of thermosetting and thermoplastic materials. In addition, the reinforcing material of the composite polymeric material can be chopped fibers, continuous fibers, or a combination of chopped and continuous fibers. The fibers can be oriented relative to one another, they can be random, or a portion of the flakes of composite polymeric material can employ oriented fibers and another portion of the flakes of composite polymeric material can employ randomly oriented fibers.

Another aspect of the present invention resides in an OSB in which flakes of a composite material are mixed with wood flakes but concentrated in particular areas of the OSB. For example, the flakes of composite materials can be concentrated along edge portions of the OSB as the addition of the composite material may enhance the fastener retention properties of the OSB. In addition, the flakes of composite material can be concentrated in other areas of the OSB where enhanced fastener retention properties and/or enhanced mechanical properties are desired.

In yet another aspect, the present invention resides in a method and machinery for forming composite materials. The machinery is a forming line that facilitates the production of composite mats wherein the composite and/or other materials from which the mats are comprised can be highly oriented, randomly oriented, semi-oriented, or combinations thereof. The orientation is accomplished using a spreader that spreads or disperses flakes of the composite and/or or other materials, the spreader being positioned above a forming conveyor. A motorized rotating table is positioned on and is movable along the forming conveyer. During a forming process, flakes are spread into a forming bin or bunker that contains a bottom conveyor. A set of picker rolls sends a mass of flakes to an orienting deck positioned below the picker rolls. During the fall from the picker rolls to the orienting deck, the flakes pass through a set of spreader or dissolving rolls. The dissolving rolls break up clumps of flakes to promote a more uniform mat formation. The orienting deck includes a plurality of shafts upon which are mounted a plurality of spaced-apart toothed discs. The size and spacing of the discs as well as the spacing between successive shafts can be modified for different strand sizes and geometries. From the orienting deck, the flakes generally fall directly onto a forming conveyor. However, the present invention also contemplates the addition of a rotating table that travels along the forming conveyor. In one embodiment, the rotating table includes two platforms with a bottom one of the platforms remaining stationary while an upper one of the platforms rotates. The rotation of the upper platform can be either clockwise or counterclockwise. Furthermore, although the method and machinery is described as operating on flakes, the present invention is not limited in this regard as the composite material may comprise strands or other materials.

In all of the above-described embodiments, the composite flakes can be formed from larger pieces of the composite material that are subsequently chopped or otherwise cut into the flakes. If the fibers that are in the composite material are oriented in a particular direction, the flakes can also be positioned in the OSB so that the flake orientation and thereby the fiber orientation enhances the mechanical properties of the OSB.

One advantage of the present invention is that the OSB can utilize composite material flakes made from waste, recycled, or scrap composite material. The use of thermoplastic resins in particular in forming the composite material flakes has several beneficial features including, but not limited to, near-zero VOC (volatile organic carbon) emissions.

Another advantage of the OSB of the present invention is that the flakes of the composite polymeric material can be employed to enhance the mechanical properties of the OSB of the present invention. These enhancements can be overall and/or in desired directions.

Still another advantage of the OSB of the present invention is that the flakes of composite polymeric material can be concentrated in particular areas to enhance the retention of fasteners, such as, but not limited to, screws and nails, thereby making the OSB less likely to dislodge from a structure in severe weather.

The advantages set forth above are illustrative only and should not be considered an exhaustive list, as other advantages will be evident to those skilled in the pertinent art to which the present invention pertains

DETAILED DESCRIPTION OF THE INVENTION

Figure 1:
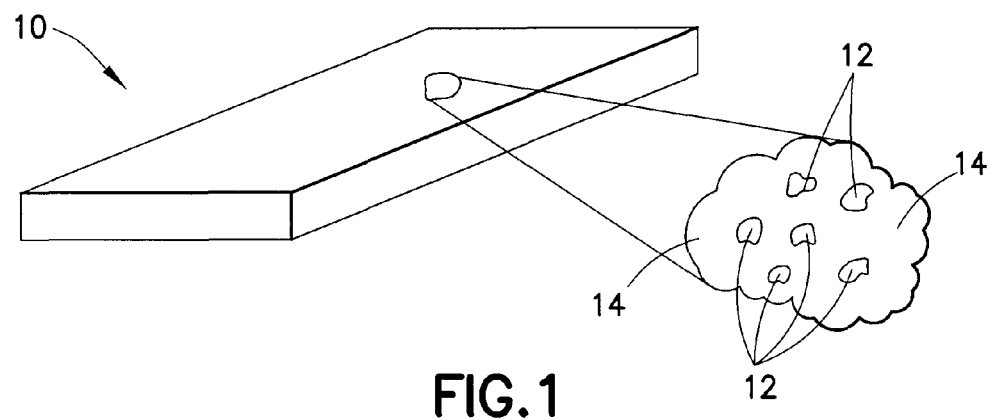
FIG. 1 is a perspective schematic view of an oriented strand board.

The oriented strand board of the present invention is a type of building material comprising wood and one or more polymers mixed with the wood. As shown in FIG. 1, one embodiment of an oriented strand board, in accordance with the present invention and hereinafter referred to as "OSB," is generally designated by the reference number 10. In particular, the OSB 10 comprises a wood component 12 and a composite polymeric material 14 that contains reinforcing fibers in a polymeric matrix. In a process of manufacturing the OSB 10, the wood component 12 is mixed with the composite polymeric material 14 to form a heterogenous admixture, which is molded, pressed, or otherwise formed into a desired shape defining the OSB 10. Although the embodiments described below are referred to as "oriented strand board," it should be understood by those of skill in the art that such a term can be used interchangeably with the term "oriented strand lumber."

The composite polymeric material 14 includes a polymeric matrix into which the reinforcing structure is incorporated. The polymeric matrix can be a thermosetting polymer, a thermoplastic polymer, or any combination thereof. Any combination of two or more matrices may be arranged as a laminate structure. When a laminate is defined, different layers of the laminate can include thermosetting polymers and/or thermoplastic polymers.

In embodiments in which the composite polymeric material 14 is thermoplastic, the thermoplastic may be a high molecular weight thermoplastic polymer, including but not limited to, polypropylene, polyethylene, nylon, PEI (polyetherimide) and copolymers, more preferably, polypropylene and polyethylene. Thermoplastic loading by weight can vary widely depending on physical property requirements of the intended use of the product or OSB 10.

The reinforcing structure of the composite polymeric material 14 comprises fibers, which can be long and/or short, longitudinally oriented, randomly oriented, continuous, or a combination thereof when combined with the polymeric matrix. A sheet, fragment, laminate, or ply of composite polymeric material may be characterized as "unidirectional" in reference to the principally unidirectional orientation of the fibers therein. The fibers may, in the alternative, be randomly oriented. Longer fibers may be chopped to result in shorter fibers. The present invention is not limited to the use of fibers as the reinforcing structure, however, as pellets, beads, rods, combinations thereof, and the like may alternatively or additionally be used.

In one exemplary method of manufacturing the composite polymeric material 14 for use in the OSB 10, the fibers are oriented in the desired manner and combined with the polymeric material of the matrix. In any method of manufacturing the composite polymeric material 14, the fibers are either bound by the addition of a resin in the manufacturing method or bound through the use of partially-cured matrix resins. The present invention is not limited to the manufacture of the composite polymeric material 14 in these manners, however, as other methods of forming the material are within the scope of the present invention. Once the composite polymeric material 14 is formed as having the matrix and the fibers therein, the composite polymeric material may be in sheet, laminate, or other form. When in sheet form, the sheet may be a continuous roll.

If the composite polymeric material 14 is used without having been put to any other previous use, the composite polymeric material 14 is termed "virgin" or "first generation" material. However, the composite polymeric material 14 for use in this invention may include "second-generation" material, i.e., scrap or waste material, or recycled composite material. The composite polymeric material 14 may be derived from a source comprising the virgin material and/or the second generation material. In any case, the composite polymeric material 14 is a source material from which the OSB 10 is manufactured.

In one form, the composite polymeric material 14 for use in the OSB 10 of the present invention is in the form of flakes derived from the source material being in sheet, laminate, or other form. In providing the composite polymeric material 14 as flakes, the sheet or laminate is chopped, cut, ground, or otherwise divided into suitably sized pieces. The source material may be divided into flakes that may have various lengths, e.g., about 1 to about 6 inches (in.) (about 2.5 to about 15.25 centimeters (cm)) long, and of various widths, e.g., about ¼ to about 3 in. (about 0.6 to about 7.6 cm) wide. However, the present invention is not limited in this regard as longer and/or narrower divisions of the source material (e.g., into strands, pellets, beads, or the like) are within the scope of the present invention. The configuration of the source material into flakes as described herein facilitates the easy and convenient packaging, storage, and transport of the composite polymeric material 14 for use in the OSB 10.

The flakes used in the OSB 10 of the present invention can include flakes made exclusively from the same material or the flakes can be made from different composite materials. Flakes of different composite material can include, but are not limited to, materials having different polymer matrices, materials having different fibers, materials having differently oriented fibers, and combinations thereof. The flakes of composite polymeric material 14 can also be formed from laminates where the plies forming each layer of the laminate are formed of the same or a different material and may be oriented differently relative to one another.

Figure 2:
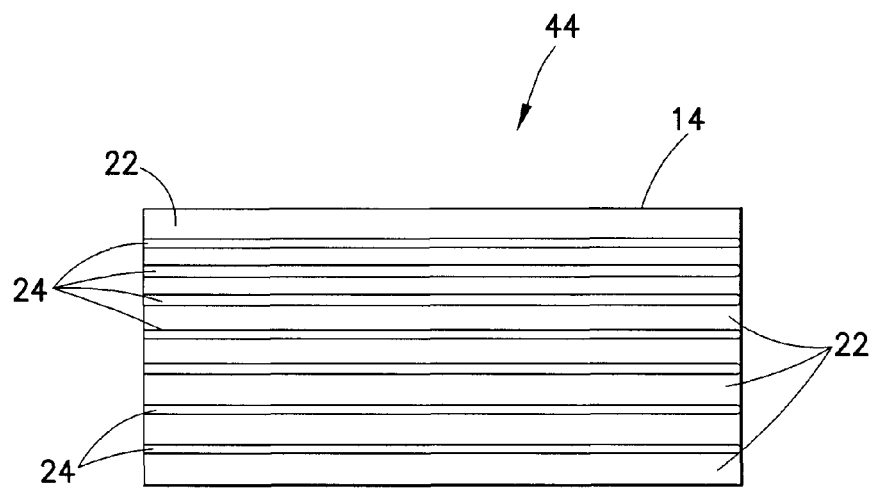
FIG. 2 is a schematic top view of a flake of composite polymeric material having continuous, unidirectionally oriented fibers.
Figure 3:
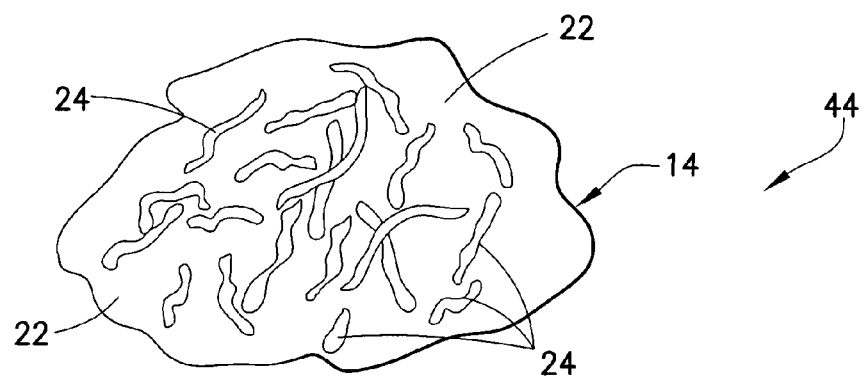
FIG. 3 is a schematic top view of an irregularly-shaped flake of composite polymeric material having chopped randomly oriented fibers.

As shown in FIG. 2, one embodiment of a flake is designated generally by the reference number 44. The flake 44 of the composite polymeric material 14 includes a polymeric matrix 22 and a plurality of longitudinally aligned fibers 24 located within the polymeric matrix. The flake 44 of the composite polymeric material 14 is shown in FIG. 2 as being rectangular; however, the present invention is not limited in this regard as the flake of composite polymeric material 14 can be any shape without departing from the broader aspects of the present invention. For example and as shown in FIG. 3, the flake 44 can be irregularly shaped. In addition, the fibers 24 forming part of the irregularly-shaped flake 44 are chopped and randomly oriented. In either the rectangularly-shaped flake 44 or the irregularly-shaped flake 44, the polymeric matrix material 22 is preferably a thermoplastic polymer. However, the present invention is not limited in this regard as thermosetting polymers can also comprise the matrix material.

Figure 4:
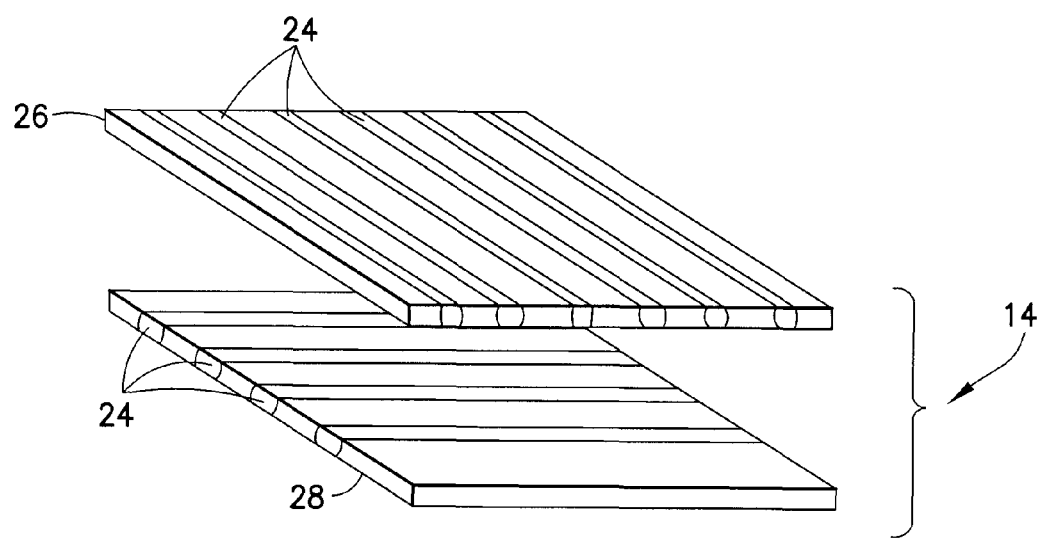
FIG. 4 is a perspective schematic view of a laminate flake of composite polymeric material.

Referring to FIG. 4, another embodiment of the flake 44 of composite polymeric material 14 is formed from a laminate of layers of composite material 26 and 28. In the illustrated embodiment, each of the layers 26 and 28 include fibers 24 that are substantially continuous across the surface of each of the layers and are oriented to be substantially parallel. The fibers 24 in one of the layers 26 are also oriented substantially orthogonally to the fibers in the adjacent layer 28. However, the present invention is not limited in this regard as the fibers 24 in each layer can be oriented at any angle relative to one another. In addition, the fibers 24 in each layer can be of different material and can also be chopped, continuous, aligned, randomly oriented, and combinations thereof. While the illustrated embodiment of the flake of composite polymeric material 14 is shown having two layers, the present invention is not limited in this regard as any practical number of layers of composite polymeric material may comprise the flake without departing from the broader aspects of the present invention.

In use, the above-described flakes 44 form a constituent in the OSB 10. The flakes 44 of composite polymeric material 14 are mixed with the wood component 12 (which may also be in flake form) and are then processed into the form of the OSB 10. An adhesive may or may not be used to bind the wood component 12 with the composite polymeric material 14. The flakes 44 can be positioned within the OSB so that the continuous fibers therein are aligned relative to one another in a particular direction. By aligning the fibers in a particular direction, the OSB 10 may be strengthened in a desired direction.

Figure 5:
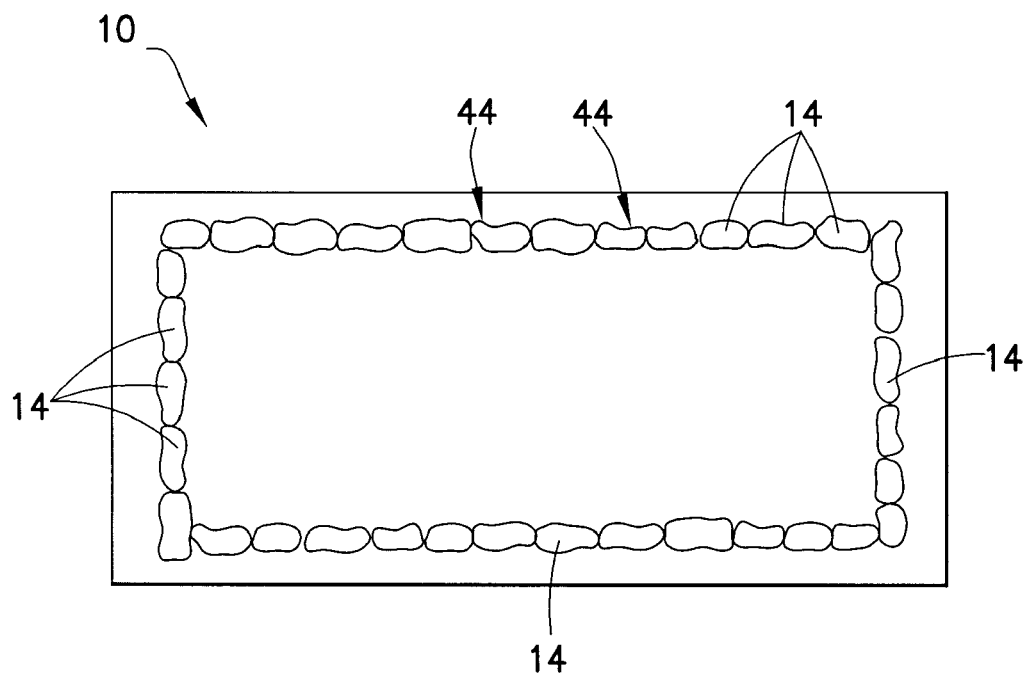
FIG. 5 schematically illustrates flakes of composite polymeric material concentrated around the periphery of an oriented strand board.
Figure 6:
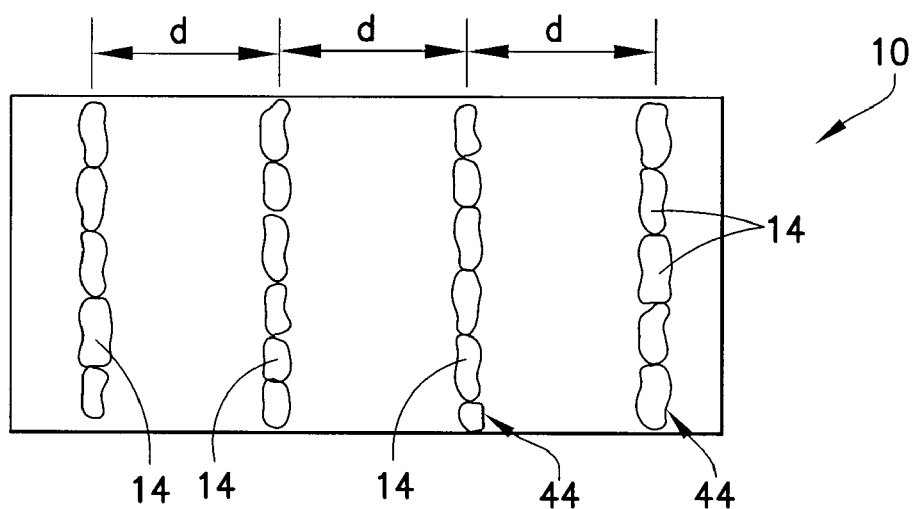
FIG. 6 schematically illustrates flakes of composite polymeric material concentrated in rows on an oriented strand board.
Figure 7:
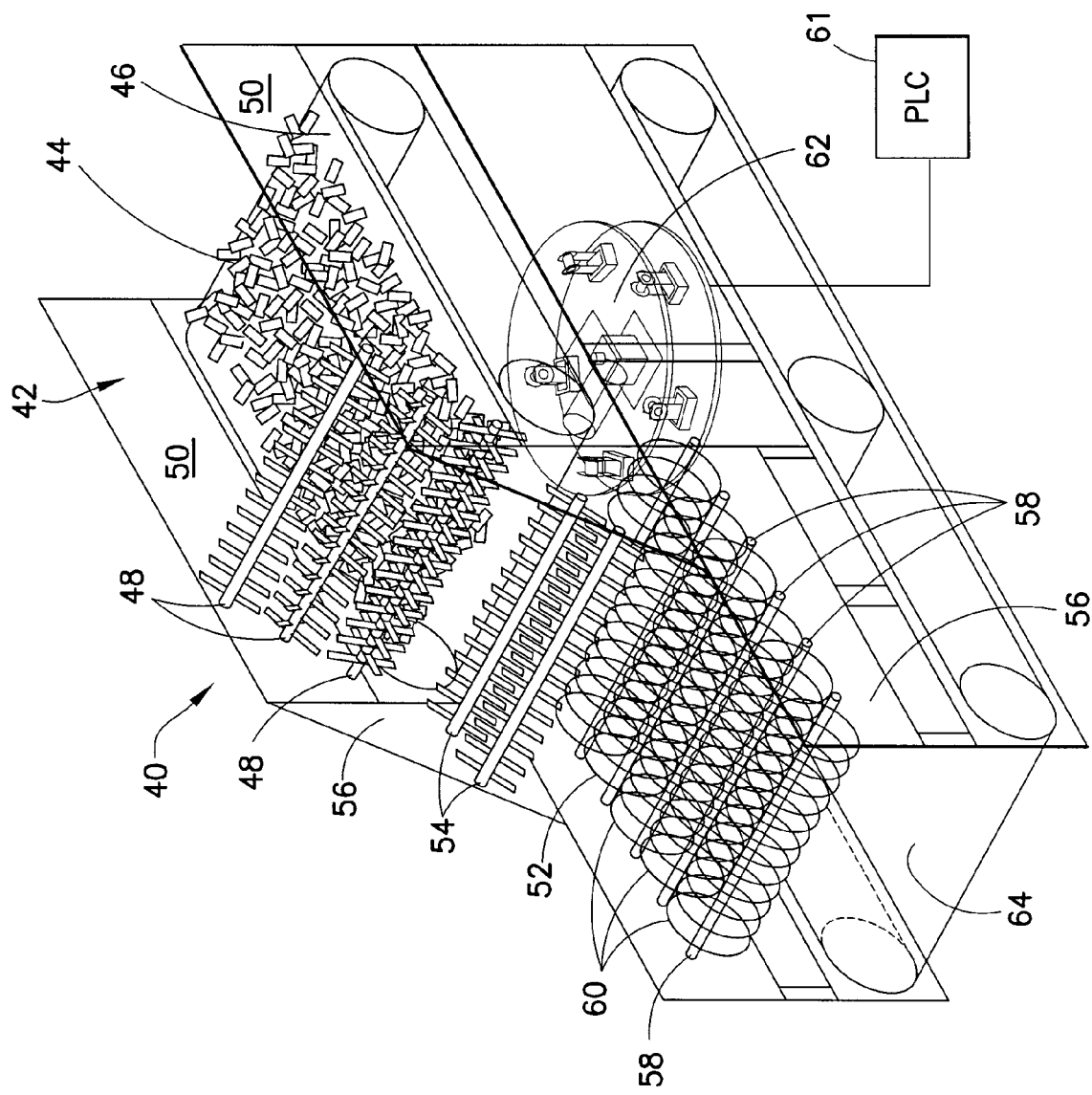
FIG. 7 is a schematic perspective view of a forming line.
Figure 8:
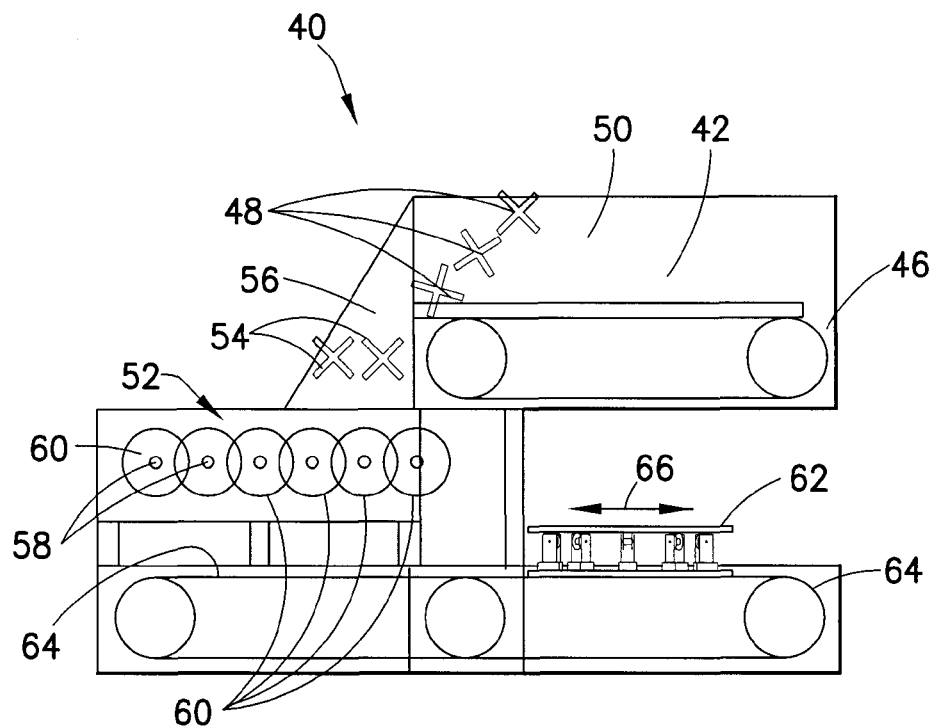
FIG. 8 is a schematic side view of the forming line of FIG. 7.
Figure 9:
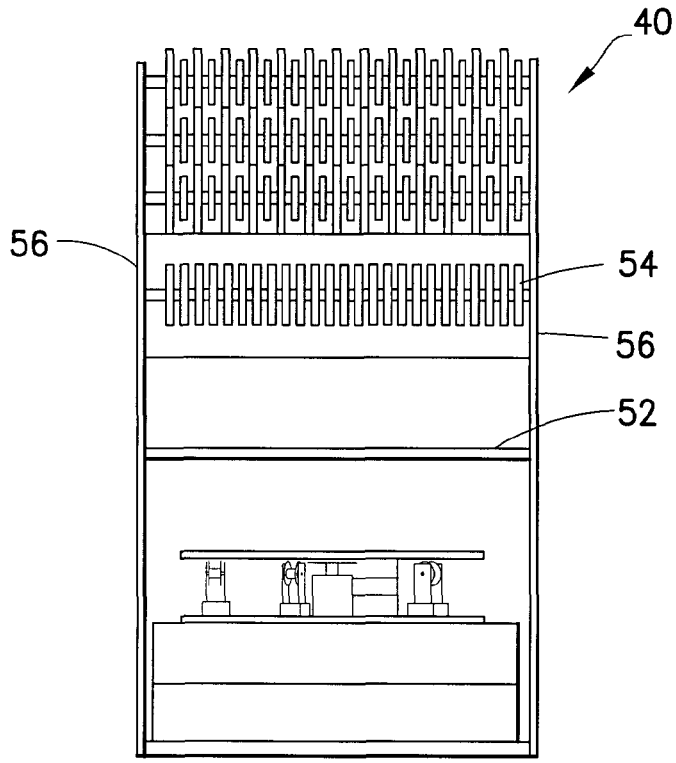
FIG. 9 is a schematic front view of the forming line of FIG. 7.

As shown in FIGS. 5 and 6, the flakes 44 can also be concentrated in certain areas of the OSB 10 such as along the peripheral edges, as shown in FIG. 5. This can enhance the capability of the OSB 10 to better retain a fastener (not shown), such as, but not limited to a screw or a nail. Alternatively, and as shown in FIG. 6, the flakes 44 can be concentrated in rows separated by distances d along the OSB 10 in areas where fasteners would normally be placed, such as in strips about 16 inches apart in panels of OSB so as to coincide with the standard building practice of placing studs and joists 16 inches apart in building construction. Still further, in embodiments in which the OSB 10 is made up of a plurality of laminates, the flakes 44 can be concentrated in layers of the OSB proximate the faces of the OSB. While the concentration of composite flakes has been shown and described as being along peripheral edges or in rows within the OSB 10, the present invention is not limited in this regard as the concentration of composite flakes can be located anywhere within the OSB without departing from the broader aspects of the present invention. Moreover, while the flakes 44 of composite polymeric material 14 have been shown in the illustrated embodiment as a layer, this is for illustration and ease of understanding only. As shown, the flakes 44 comprising the composite polymeric material 14 and the wood component 12 (e.g., also in flake form) are mixed with one another.

Referring now to FIGS. 1-6, in constructing the OSB 10, the composite polymeric material 14 may comprise one or more of any of various types of fibers. Exemplary fibers include, but are not limited to, E-glass fibers and S-glass fibers. E-glass is a low alkali borosilicate glass with electrical and mechanical properties and chemical resistance that is suitable for use in numerous applications including OSB. This type of glass is the most widely used in fibers for reinforcing plastics.

S-glass is a magnesia-alumina-silicate glass that can be used aerospace applications where high tensile strength is desired. S-glass is generally higher in strength than E-glass and is generally a higher cost material relative to E-glass. Both E-glass and S-glass are preferred fibers in this invention.

E-glass fiber may be incorporated in the composite in a wide range of fiber weights and thermoplastic polymer matrix material. The E-glass may range from about 10 to about 40 ounces per square yard (oz./sq. yd.), more preferably 19 to 30 and most preferably 21.4 to 28.4 oz./sq. yd. of reinforcement.

The quantity of S-glass or E-glass fiber in a composite polymeric material 14 of the present invention may optionally accommodate about 40 to about 90 weight percent (wt %) thermoplastic matrix, more preferably about 50 to about 85 wt % and most preferably, about 60 to about 80 wt % thermoplastic matrix in the ply, based on the combined weight of thermoplastic matrix plus fiber.

Other fibers may also be incorporated, optionally in combination with E-glass and/or S-glass. Such other fibers include ECR, A and C glass, as well as other glass fibers, fibers formed from quartz, magnesia aluminosilicate, non-alkaline aluminoborosilicate, soda borosilicate, soda silicate, soda lime-aluminosilicate, lead silicate, non-alkaline lead boroalumina, non-alkaline barium boroalumina, non-alkaline zinc boroalumina, non-alkaline iron aluminosilicate, cadmium borate, alumina fibers, asbestos, boron, silicone carbide, graphite and carbon such as those derived from the carbonization of polyethylene, polyvinylalcohol, saran, aramid, polyamide, polybenzimidazole, polyoxadiazole, polyphenylene, PPR, petroleum and coal pitches (isotropic), mesophase pitch, cellulose and polyacrylonitrile, ceramic fibers, and metal fibers such as for example steel, aluminum metal alloys, and the like.

A preferred organic polymer fiber for use in the OSB 10 is formed from an aramid available under the tradename Kevlar from Du Pont. This aramid comprises high performance, bundled fibers having tensile strength suitable for use in the OSB 10. Other preferred high performance, unidirectional fiber bundles generally have a tensile strength greater than 7 grams per denier. These bundled high-performance fibers may be more preferably any one of, or a combination of, aramid, extended chain ultra-high molecular weight polyethylene (UHMWPE), poly [p-phenylene-2,6-benzobisoxazole] (PBO), and poly[diimidazo pyridinylene (dihydroxy) phenylene] (M5). The use of these very high tensile strength materials is also particularly useful for making composite ballistic armor panels and similar applications requiring very high ballistic properties.

Still other fiber types known to those skilled in the particular art to which the present invention pertains can be substituted without departing from the broader aspects of the present invention. For example, other aramid fibers that can be used include those marketed under the trade names Twaron, and Technora; basalt, carbon fibers such as those marketed under the trade names Toray, Fortafil and Zoltek; Liquid Crystal Polymer (LCP), such as, but not limited to LCP marketed under the trade name Vectran. Based on the foregoing, the present invention contemplates the use of organic, inorganic, and metallic fibers either alone or in combination.

As shown in FIGS. 7-10, a machine or forming line generally designated by the reference number 40 is used to produce mats or panels in which the flakes 44 are randomly oriented for use in the OSB 10 of the present invention. The forming line 40 includes a forming bin 42 into which the flakes 44 are positioned. A conveyor 46 is located at the bottom of the forming bin 42. During operation, the conveyor 46 transports the flakes 44 in the forming bin 42 to a plurality of picker rolls 48 rotatably mounted to walls 50 that at least in part define the forming bin. As the conveyor 46 moves the flakes 44, the picker rolls 48 send a substantially uniform mass of flakes 44 toward an orienting deck generally designated by the reference number 52. As the flakes 44 fall toward the orienting deck 52, they pass through a number of spreader or dissolver rolls 54 rotatably mounted to a frame 56 forming part of the forming line 40. The dissolver rolls 54 break apart clumps of flakes 44 so that a more uniform mat is formed.

The orienting deck 52 comprises a plurality of shafts 58 rotatably mounted to the frame 56 upon which are mounted a plurality of spaced apart toothed discs 60. The size and spacing of the toothed discs 60, as well as the spacing of the shafts 58 can be changed for different strand sizes and geometries. The flakes 44 then fall onto a rotating (or rotatable) table, generally designated by the reference number 62. The rotating table 62 is positioned on a forming conveyor 64 which moves the table back and forth in the directions indicated by the arrows 66.

Figure 10:
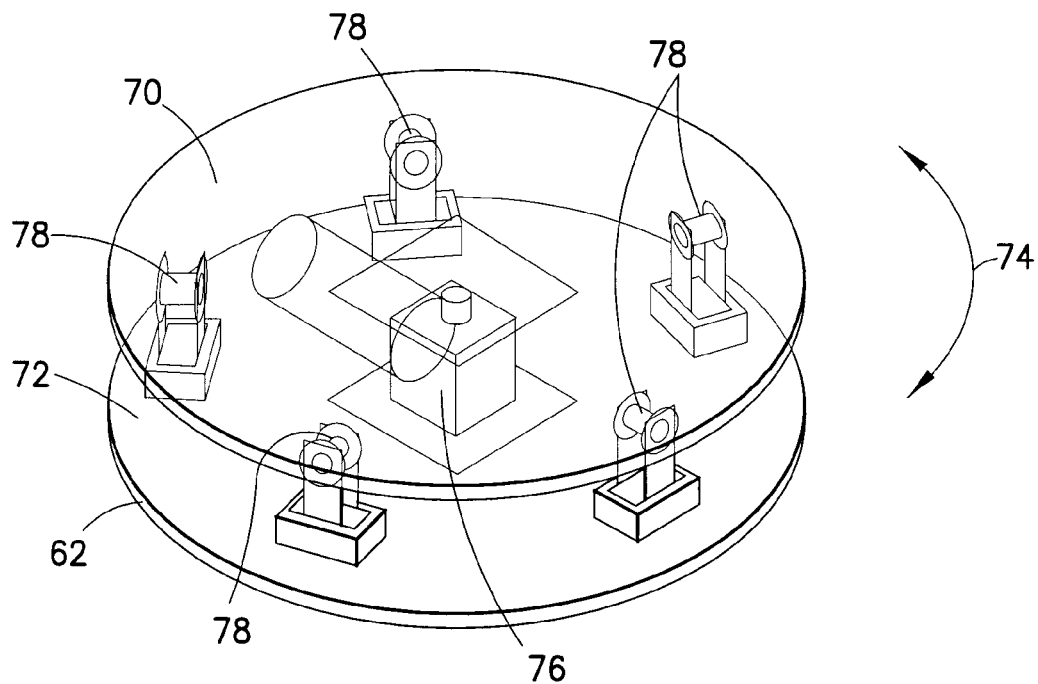
FIG. 10 is a schematic perspective view of a rotating table that forms part of the forming line of FIG. 7.
Figure 11:
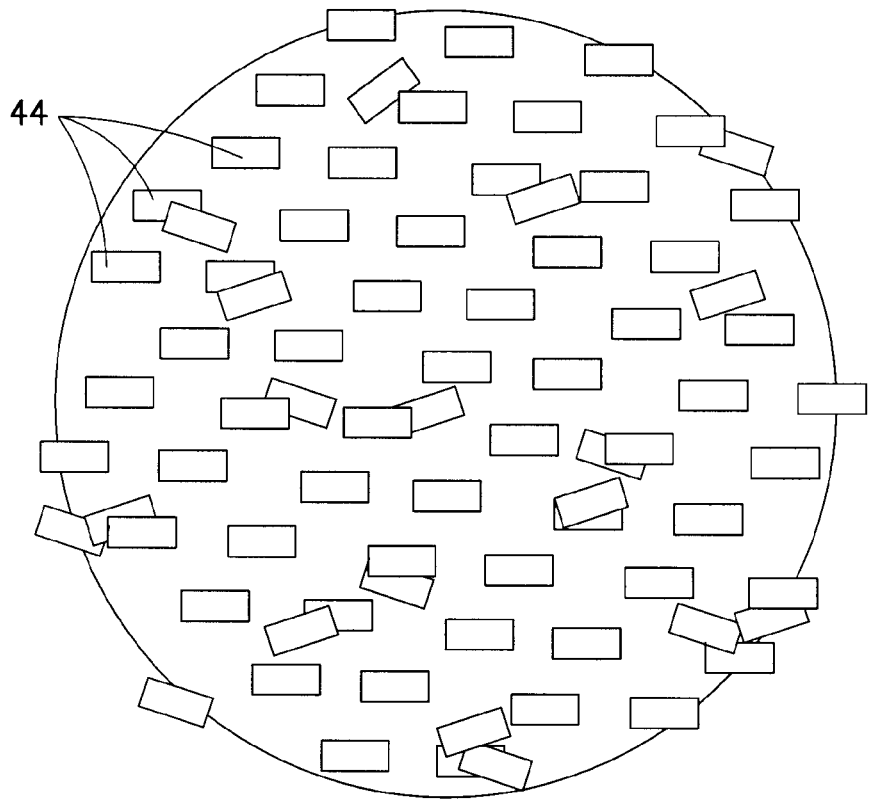
FIG. 11 is a schematic illustration of aligned flakes.
Figure 12:
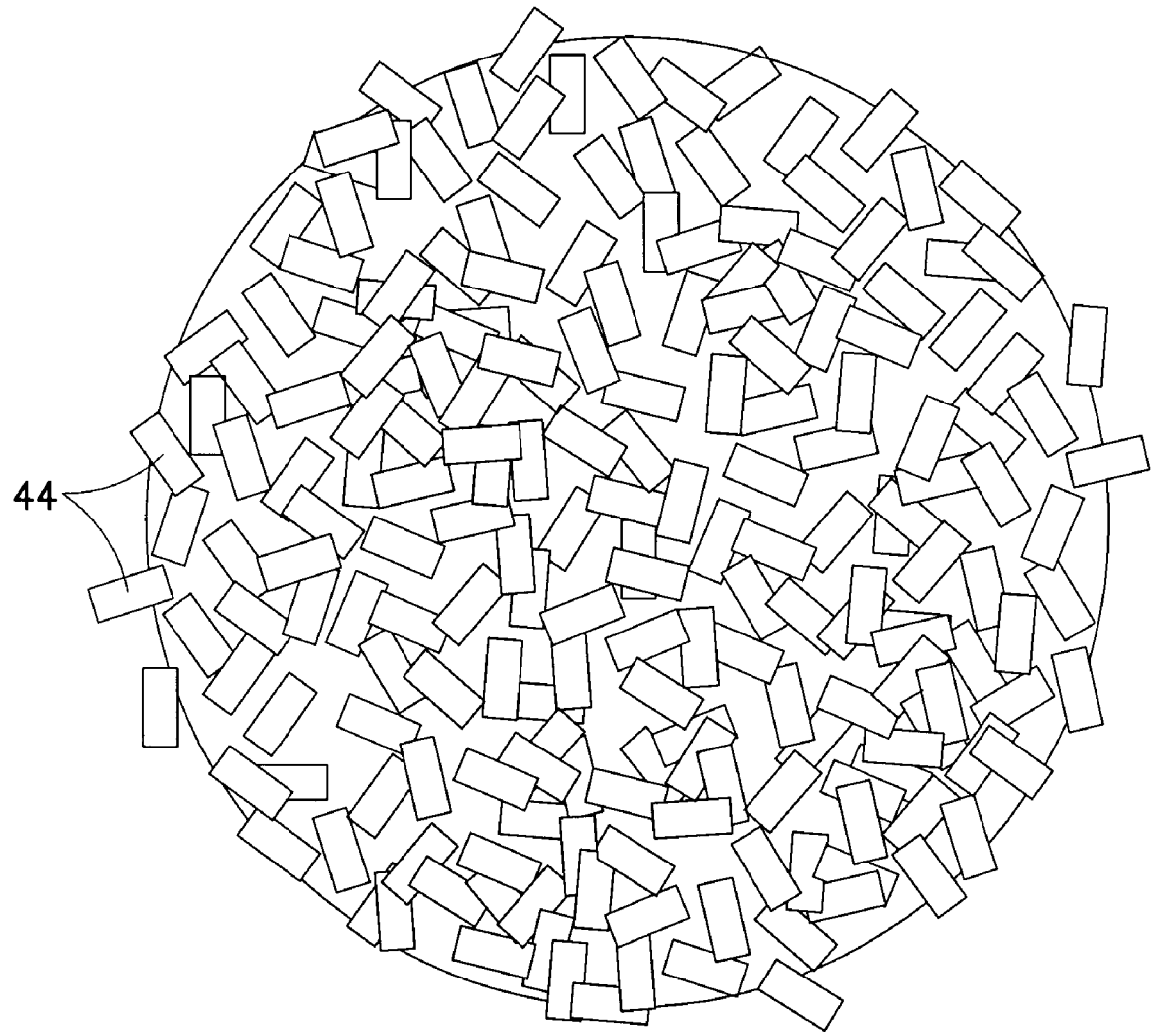
FIG. 12 is a schematic illustration of randomly oriented flakes.

Referring to FIG. 10, the rotating table 62 includes an upper rotatable platform 70 and a lower stationary platform 72. The upper platform 70 is rotatable either clockwise or counterclockwise as indicated by the arrows 74. A motor and gearbox 76 rotate the upper platform 70 in response to commands issued from a PLC (programmable logic controller) 61 or other controller. A set of support wheels 78 are mounted along the periphery of the lower platform 72 and rotatably support the upper platform 70. During operation, if the rotating table 62 is not rotating, the flakes 44 will be oriented substantially uniformly as shown in FIG. 11. When the rotating table 62 rotates, the flakes 44 will be oriented in a substantially random fashion as shown in FIG. 12. Desired degrees of orientation, between that shown in FIG. 11 and that shown in FIG. 12 can be produced by controlling the degree of rotation of the rotating table 62.

In addition, the upper platform 70 can move generally rectilinearly back and forth along the conveyor 46. When the rotating table 62 is turned off so that it does not rotate, the forming line 40 produces flakes or strands that are substantially uniformly oriented. When the rotating table 62 rotates, the flakes or strands are laid down in a random fashion. A semi oriented mat can also be produced in any degree range through control of rotation of the rotating table 62.

The flakes 44 may be combined and processed with wood flakes as desired. In particular, the flakes 44 may be mixed with the wood flakes in the forming bin 42 and dropped with the wood flakes onto the rotating table 62, or the flakes 44 can be dropped onto wood flakes on the rotating (or stationary) table. In either case, the dropped flakes 44 are pressed under pressure and heat into a mat or other panel-type product.

The forming line 40 can be used to form mats wherein the flakes, strands, or other divisions of material used to form the OSB 10 are all wood, all fiber reinforced polymer composite, or combinations thereof.

The orientation of the fibers via the rotating table 62 allows for the control of the mechanical properties of the finished flake, which in turn allows for the control of the mechanical properties of the OSB 10 into which the flake is incorporated. For example, as mechanical properties such as stiffness and bending strength are correlated with the particular orientations of a fiber in a matrix in a composite material, these properties can be controlled by programming the rotating table 62. Mats produced can have completely random strand orientation to provide quasi-isotropic transverse properties, or they may have highly aligned strand orientation to give controlled anisotropic properties. The strand orientation may be constant throughout the thickness of the mat produced, or it may have layers with different strand orientations to further affect the mechanical properties as well as physical properties. Once the mat is formed, it can be cut, pressed, or otherwise formed into the OSB 10 of desired shape.

Example

An experiment was conducted to (1) design and build a rotating forming table that could be used with other OSB forming equipment, (2) determine the degree of flake orientation (or randomness) using the rotating forming table and other OSB forming equipment for multiple runs, and (3) press boards measuring 7/16 in. thick×36 in.×36 in. made with either random or oriented flakes, the flakes comprising polypropylene/fiberglass measuring 0.010 in.×1.5 in.×4 in. Two panels were made with randomly oriented flakes (the receiving table was rotated during layup), and one panel was made with aligned flakes (the receiving table was stationary during layup). The degree of flake alignment was measured using digital image analysis. Three specimens nominally measuring 7/16 in. thick×3 in.×12.5 in. were cut from each panel in the 0°, 45° and 90° orientation relative to the machine direction. Each specimen was tested in flexure (10.5 in. span).

Theoretically, all specimens from the randomly oriented panels should have had equal (quasi-isotropic) properties as related to the modulus of rupture (MOR, or bending strength) and to the modulus of elasticity (MOE, or bending stiffness). In contrast, the panels made with oriented flakes relative to the machine direction (0°) should have had the highest properties in the 0° specimens; lower in the 45° specimens, and lowest in the 90° specimens. Summary statistics are shown in Table 1.

TABLE 1

Results summary from flexural testing

| TRT Group | Orientation (degrees) | n | MOR (psi) Ave | MOR (psi) Stddev | MOR (psi) COV | MOE (psi) Ave | MOE (psi) Stddev | MOE (psi) COV | Density (pcf) Ave | Density (pcf) COV | Actual data PA +/− 10 | Actual data PA +/− 20 |
|---|---|---|---|---|---|---|---|---|---|---|---|---|
| Random #11 | 0 | 3 | 17,472 | 620 | 3.5 | 1,398,862 | 19,802 | 1.4 | 99.0 | 0.2 | 10.8 | 20.6 |
|  | 45 | 3 | 18,058 | 1,769 | 9.8 | 1,347,932 | 83,437 | 6.2 | 98.1 | 1.8 |  |  |
|  | 90 | 3 | 18,647 | 4,054 | 21.7 | 1,332,775 | 189,418 | 14.2 | 98.0 | 0.6 |  |  |
| Random #12 | 0 | 3 | 15,650 | 1,978 | 12.6 | 1,191,285 | 223,057 | 18.7 | 97.2 | 0.8 | 16.6 | 32.0 |
|  | 45 | 3 | 16,439 | 1,439 | 8.8 | 1,363,045 | 173,708 | 12.7 | 97.4 | 1.0 |  |  |
|  | 90 | 3 | 18,095 | 1,854 | 10.2 | 1,447,538 | 129,292 | 8.9 | 97.2 | 0.7 |  |  |
| Oriented #13 | 0 | 3 | 24,983 | 1,481 | 5.9 | 2,539,866 | 111,739 | 4.4 | 97.2 | 1.1 | 23.2 | 43.5 |
|  | 45 | 3 | 12,776 | 5,826 | 45.6 | 982,188 | 321,349 | 32.7 | 96.5 | 1.2 |  |  |
|  | 90 | 3 | 8,344 | 2,696 | 32.3 | 435,189 | 182,332 | 41.9 | 97.8 | 1.5 |  |  |

Figures 13, 14:
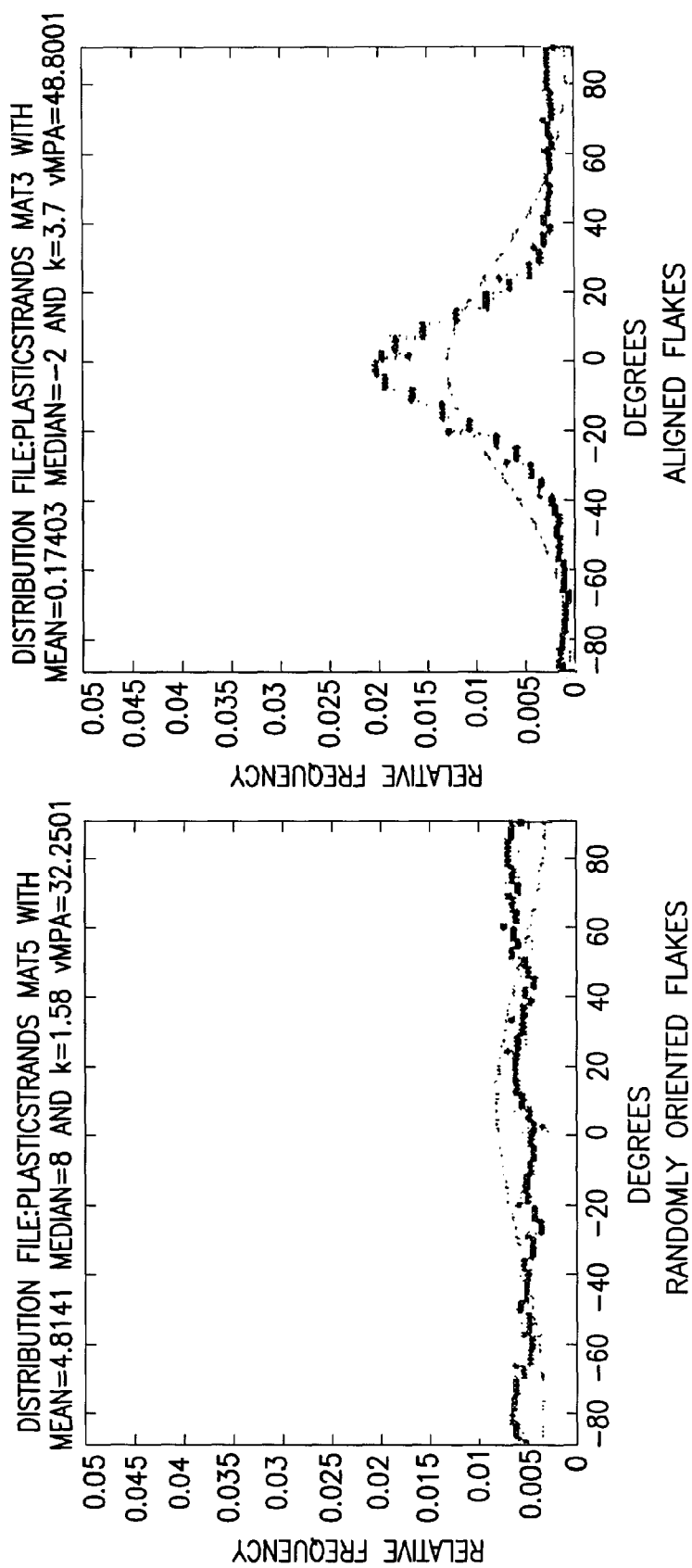
FIG. 13 is a graphical representation of a flake orientation plot.
FIG. 14 is another graphical representation of a flake orientation plot.

As expected, the MOR and MOE for the randomly oriented panels (#11 and #12) were all similar regardless of flake orientation relative to the machine direction while those from the oriented panel (#13) varied significantly based on flake orientation (with 0° being highest and 90° being lowest). Also, as can be seen in the last two columns of Table 1, the percent alignment (PA) indicating the percentage of flakes that fall within both +/−10° and +/−20° of the mean orientation angle is shown. Completely random orientation is 11% and 22% for the +/−10° and +/−20° measures, respectively. Panel #11 and #12 were significantly randomized while #13 had a clear orientation in the machine direction (the degree of orientation in #13 could be significantly increased by decreasing the free fall distance of the flakes, namely, the distance from the bottom of the orienting discs to the top of the mat). Examples of the image analysis flake orientation plots produced for each panel are shown in FIGS. 13 and 14. Note that the randomly oriented mat (FIG. 13) shows an equal distribution of flake angles, while the aligned panel clearly has a majority of flakes aligned along the 0° axis.

The terms "first," "second," and the like, herein do not denote any order, quantity, or importance, but rather are used to distinguish one element from another. In addition, the terms "a" and "an" herein do not denote a limitation of quantity, but rather denote the presence of at least one of the referenced item.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A method of forming an OSB, the method comprising the steps of:
    forming flakes of a composite polymeric material;
    positioning the flakes in a bin;
    transporting the flakes from the bin to a picker roll using a conveyor;
    transporting a substantially uniform mass of the flakes from the picker roll to an orienting deck, the orienting deck comprising a plurality of spaced apart discs rotatably mounted on shafts;
    breaking apart clumps of the flakes as the flakes are transported from the picker roll to the orienting deck;
    causing the flakes to drop from the orienting deck to a table under the orienting deck; and
    pressing the dropped flakes using heat and pressure to form the OSB.

2. The method of claim 1, further comprising rotating the table to orient the flakes falling from the orienting deck.

3. The method of claim 2, further comprising controlling the rotating of the table using a programmable logic controller.

4. The method of claim 1, further comprising moving the table in a rectilinear direction to orient the flakes falling from the orienting deck.

5. The method of claim 4, further comprising rotating the table.

6. The method of claim 4, wherein the step of moving the table in the rectilinear direction comprises moving the table on a conveyor.

7. The method of claim 1 wherein the forming of the flakes comprises dividing the flakes into pieces.

8. The method of claim 1 wherein the flakes are formed from a laminate of layers of the composite polymeric material.

9. A method for processing flakes comprising:
    forming flakes of a composite polymeric material;
    positioning the flakes in a bin;
    transporting the flakes from the bin to a picker roll using a conveyor;

transporting a substantially uniform mass of the flakes from the picker roll to an orienting deck, the orienting deck comprising a plurality of spaced apart discs rotatably mounted on shafts;

breaking apart clumps of the flakes as the flakes are transported from the picker roll to the orienting deck;

causing the flakes to drop from the orienting deck to a table under the orienting deck; and rotating the table to orient the dropped flakes.

* * * * *